L. C. BISHOP.
PHOTOGRAPHIC OBJECTIVE.
APPLICATION FILED OCT. 16, 1919.
1,347,673. Patented July 27, 1920.
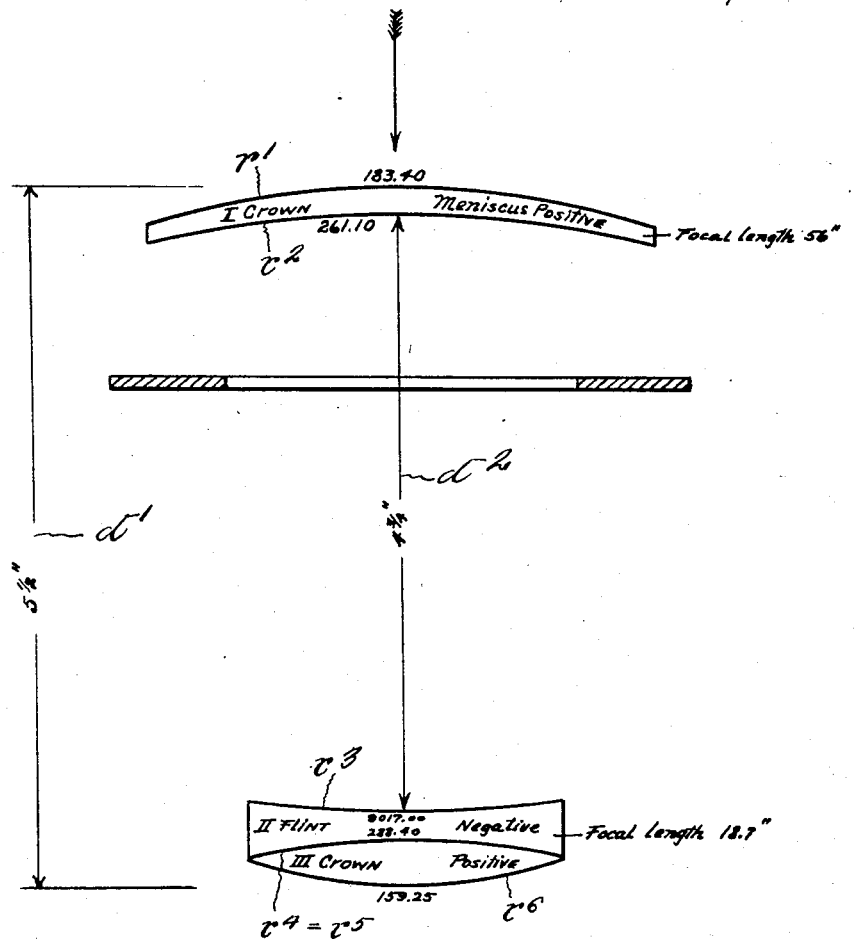

UNITED STATES PATENT OFFICE.

LLOYD C. BISHOP, OF SOUTH BEND, INDIANA.

PHOTOGRAPHIC OBJECTIVE.

1,347,673.      Specification of Letters Patent.      Patented July 27, 1920.

Application filed October 16, 1919. Serial No. 331,218.

*To all whom it may concern:*

Be it known that I, LLOYD C. BISHOP, a citizen of the United States, residing at South Bend, in the county of St. Joseph and State of Indiana, have invented certain new and useful Improvements in Photographic Objectives, of which the following is a specification.

The present invention relates to photographic objectives and more particularly to portrait lenses.

Since the beginning of the art of photography lens designers have concentrated their efforts trying to evolve a lens free from aberrations. These efforts especially since the introduction of special optical glass, have met with almost complete success. Most of the well known types of portrait lenses, in particular, are so fully corrected as to produce a critically sharp picture in the focal plane.

As ideal as this condition may be from the stand point of the computing mathematician striving to compromise the various opposing factors, its advantages are offset to a great extent by the disadvantage of lack of depth, especially for larger images.

Since for bust pictures, or for pictures of the head, the person to be photographed is relatively close to the camera, the image plane is correspondingly moved away from the lens. The conjugate relation of object plane and image plane under these conditions is such that relatively small changes of object plane causes an appreciable shifting of the image plane. The photographic significance of this point is that, if the object plane proper covers certain parts of the head or body of the person, these parts will appear sharp and distinct while points to the rear or in front of this object plane appear diffused or indistinct.

A well known remedy to obtain depth of focus is to stop down the lens in order to allow only slender light cones to pass and thereby decrease the circles of diffusion in front and in the rear of the principal image plane. This remedy, however, operates at the expense of speed because the light is cut out in proportion as the lens is stopped down. A portrait produced in this way is, moreover, objectionable in that the critical sharpness in parts of such a portrait has a weird, unlifelike and displeasing effect.

The photographer is thus forced to adopt either of two alternatives either one of which results in an objectionable portrait or to make a compromise between extremes, which compromise entails the objectionable results of both. The outstanding characteristic features are always lack of depth, lack of softness, or both in more or less pronounced form.

It is the primary object of this invention to provide a photographic objective which combines high working speed, great depth of focus and good definition.

Another object is to produce an objective which, aside from the properties just mentioned, has the advantage of light weight and cheapness and is of general utility.

In the drawing, which forms a part of the specification, 1 represents the front lens and 2 the back lens of the combination. The back lens is a cemented positive, made up of a biconvex positive and a biconcave negative forming together a fully achromatic lens. When used with an uncorrected front lens it is sufficiently corrected for practical purposes.

The front lens is a thin meniscus positive whose focal length is from three to ten times that of the back lens and whose diameter is about 50% to 60% larger than the diameter of the back lens.

While there is, of course, considerable latitude, an objective of the following characteristics may be considered as representative of the invention.

I. Front lens—
    $r_1 = 183.40$      $D = 1.5170$
    $r_2 = 261.10$      $\nu = 54.3$ II. Biconcave of back lens—
    $r_3 = 9017.00$      $D = 1.626$
    $r_4 = 288.40$      $\nu = 36.6$ III. Biconvex of back lens—
    $r_5 = r_4 = 288.40$      $D = 1.5170$
    $r_6 = 159.25$      $\nu = 54.3$
    $d_1 = 5.5''$      $F_1 = 56''$
    $d_2 = 4.75''$      $F_2 = 18.7''$
                       $E = 15''$ wherein $r$ refers to radius of curvature, D to index of refraction, $\nu$ to power of dispersion, $F_1$ to focal length of the front lens, $F_2$ to focal length of the back lens and E to equivalent focal length of the combination.

All principal corrections are made on the back lens. Since this lens is relatively small, the quantity of expensive glass required is small. The larger front lens may be of inexpensive glass. The cost of the objective is therefore relatively small.

By combining the highly corrected back lens with the uncorrected front lens, the disadvantages of the two neutralize each other. The aberrations in the front lens preclude the formation of a critically sharp image in a single plane. The blending of the circles of confusion of different size brings about greater depth and softness and yet of good definition. It is not necessary to stop down in order to obtain greater depth of focus, as with the present standard forms of portrait lenses for close range work, or to improve the definition as with the so called pictorial lens which with full aperture lacks that degree of definition required for portrait work.

Curvature of field and distortion are overcome by the long focus front lens of slight convexity. By the slight convexity of the front lens the virtual object plane is flatter and the rays are more uniformly and gradually brought in and focused more evenly on the plate than could be done with the customary front lens of shorter focus and of greater convexity.

By using a shorter focus rear lens ($\frac{1}{10}$ to $\frac{1}{3}$ of the focal length of the front lens) and of comparatively smaller diameter (approximately 65% of the diameter of the front lens) the rear nodal plane of the combination is brought near the rear lens whose aperture then acts partly as a diaphragm opening.

The nearness of the back lens to the rear nodal plane and its small size make it possible to use a larger stop which allows more light to pass in from the front lens and thereby affords a greater practical working speed. The slender light cones coming through the long-focus thin front lens reach the rear lens with greater actinic power than would be possible if the larger angle light cones collected through shorter focus front lenses of smaller diameter were reduced by cutting out the marginal rays by means of the stop. A reduction of the source of light whether by the front lens or diaphragm opening reduces the amount of light reaching the rear lens.

It is understood that the focal length of the front lens may vary within wide limits. The equivalent focal length of the combination may consequently be changed by merely using front lenses of different focal lengths.

I claim:

1. A photographic objective comprising a collecting front lens of long focal length and a back lens whose focal length is between $\frac{1}{10}$ to $\frac{1}{3}$ of the front lens.

2. A photographic objective comprising a chromatically fully corrected back lens of relatively short focal length and an uncorrected front lens whose focal length is from 3 to 10 times larger than that of the back lens.

3. A photographic objective comprising a chromatically fully corrected back lens of relatively short focal length and as a front lens a meniscus positive, whose focal length is from three to ten times larger than that of the back lens.

4. A photographic objective comprising a chromatically fully corrected back lens of relatively short focal length and an uncorrected front lens whose focal length is from 3 to 10 times larger than that of the back lens and whose diameter is approximately 60% larger than the diameter of the back lens.

In testimony whereof I affix my signature.

LLOYD C. BISHOP.